United States Patent Office 2,918,478
Patented Dec. 22, 1959

2,918,478

VINYLENE CARBONATE AND METHODS OF PREPARING IT

Melvin S. Newman, Upper Arlington, Ohio, assignor to The Ohio State University Research Foundation, a corporation of Ohio No Drawing. Original application June 1, 1954, Serial No. 433,795. Divided and this application April 16, 1957, Serial No. 653,053

6 Claims. (Cl. 260—340.2)

This application is the sole application of Melvin S. Newman and is a division of a co-pending joint application of Melvin S. Newman and Roger W. Addor, Serial No. 433,795, filed June 1, 1954, which itself is in part a continuation of copending application Serial No. 338,654, filed February 25, 1953.

The invention disclosed in this application relates to vinylene carbonate; to homo polymers thereof; and to derivatives of such vinylene carbonate and of such polymers and to processes for the syntheses of such compounds.

One of the objects is therefore the preparation of vinylene carbonate.

Another object is the preparation of derivatives of vinylene carbonate.

Another object is the preparation of homo polymers of vinylene carbonate.

Another object is the preparation of derivatives of the polymers of vinylene carbonate such as, for example, reaction products of such polymers.

Further objects and features of my invention should be apparent from a consideration of the following specification and claims.

Generally my inventions in this connection as disclosed in this application, the aforesaid prior copending application and in other related applications, include (1) the chlorination of ethylene carbonate to form mono and/or dichloro ethylene carbonate and the subsequent dehydrochlorination of the mono chloro ethylene carbonate so formed and/or the dechlorination of the dichloro ethylene carbonate so formed to obtain vinylene carbonate; (2) the condensation of the vinylene carbonate with certain dienes; (3) the homo polymerization of the vinylene carbonate; (4) the copolymerization of the vinylene carbonate with certain olefins and with acetylene type compounds; (5) the hydrolysis of such polymers and copolymers; (6) the reaction of the hydrolyzed polymers and copolymers and their derivatives with nitrating agents, acetylating agents, alkylating agents, carboxy-methylating agents and other similar reactants.

More specifically as explained in copending application Serial No. 338,654, according to the part of my inventions which is claimed herein, vinylene carbonate is prepared (1) by the chlorination of ethylene carbonate to obtain monochloroethylene carbonate and/or dichloroethylene carbonate and thereafter (2) by the dehydrochlorination of the monochloroethylene carbonate and/or the dechlorination of the dichloroethylene carbonate to obtain vinylene carbonate. On heating the vinylene carbonate so obtained with a polymerizing agent or agents such as organic peroxides and acids of the protonic and non-protonic types and such as combinations of protonic and non-protonic acids, the vinylene carbonate is polymerized. The polymerizing agents referred to include:

Benzoyl peroxide
Actyl peroxide
Di-t-butyl peroxide

Dimethyl azobisisobutyronitrile—$\left( CH_3-\underset{\underset{CH_3}{|}}{\overset{\overset{CN}{|}}{C}}-N=N-\underset{\underset{CH_3}{|}}{\overset{\overset{CN}{|}}{C}}-CH_3 \right)$ Sulfuric acid
Hydrochloric acid
Hydrofluoric acid
Perchloric acid
Aluminum chloride
Zinc chloride
Boron trifluoride
Hydrogen chloride-aluminum chloride
Hydrogen fluoride-boron trifluoride On treating with a nitrating agent, an aminating agent, an acetylating agent, an alkylating agent (e.g. an etherfying agent), a carboxymethylating agent, or with other agents, I react the vinylene carbonate, the polymers, or the derivatives of such polymers further.

PREPARATION OF VINYLENE CARBONATE

I prepared two amounts of vinylene carbonate $$\begin{array}{c} HC-O \\ \parallel \phantom{xx} \searrow C=O \\ HC-O \end{array}$$

in three steps (1) by chlorinating ethylene carbonate to obtain the monochloroethylene carbonate and dichloroethylene carbonate followed (2) by dehydrochlorination of the monochloroethylene carbonate by the use of a suitable tertiary amine, and (3) by the dechlorination of the dichloroethylene carbonate with zinc dust.

The following equation shows my synthesis of vinylene carbonate using monochloroethylene carbonate as the intermediate:

$$\underset{\text{Ethylene carbonate}}{\begin{array}{c} H_2C-O \\ | \phantom{xx} \searrow C=O \\ H_2C-O \end{array}} \xrightarrow{[Cl]} \underset{\text{Monochloroethylene carbonate}}{\begin{array}{c} \overset{H}{\underset{}{|}} \\ ClC-O \\ | \phantom{xx} \searrow C=O \\ HC-O \\ | \\ H \end{array}} \xrightarrow{-HCl} \underset{\text{Vinylene carbonate}}{\begin{array}{c} HC-O \\ \parallel \phantom{xx} \searrow C=O \\ HC-O \end{array}}$$

The following equation shows my synthesis of vinylene carbonate using dichloroethylene carbonate as the intermediate:

$$\underset{\text{Ethylene carbonate}}{\begin{array}{c} H_2C-O \\ | \phantom{xx} \searrow C=O \\ H_2C-O \end{array}} \xrightarrow{[Cl]} \underset{\text{Dichloroethylene carbonate}}{\begin{array}{c} \overset{H}{\underset{}{|}} \\ Cl-C-O \\ | \phantom{xx} \searrow C=O \\ Cl-C-O \\ | \\ H \end{array}} \xrightarrow{[2Cl]} \underset{\text{Vinylene carbonate}}{\begin{array}{c} HC-O \\ \parallel \phantom{xx} \searrow C=O \\ HC-O \end{array}}$$

*Example I.—Chlorination of ethylene carbonate*

$$\begin{array}{c} CH_2O \\ \phantom{xx} \searrow C=O \\ CH_2O \end{array}$$

In a typical reaction, 103 g. (1.17 moles) of ethylene carbonate was added to a cylindrical container having a quartz tube for supplying ultraviolet light, having an inlet tube serving as an inlet for chlorine and having also an outlet tube and a heating bath. The apparatus was tared and set up so that the ethylene carbonate was heated to 70–80° C. with glycerine bath. The ultraviolet light source was activated by applying a high potential current and chlorine was passed in at a moderate rate. After passage of chlorine for 25 hours, the total gain in weight was 39 g.

The reaction mixture was rectified through a small packed column. The following fractions were taken:

| Fraction | B.P.,° C. | in mm. | in g. Weight | $n_D^{24°}$ |
|---|---|---|---|---|
| 1 | 87–91 | 32–33 | 7.7 | 1.4618 |
| 2 | 91–93+ | 33–34 | 16.2 | 1.4607 |
| 3 | 93–129 | 34–35 | 10.2 | |
| 4 | 129–132 | 34–35 | 3.7 | 1.4562 |
| 5 | 132–134 | 34–35 | 57.3 | 1.4534 |
| 6 | 124–125 | 23–24 | 24.7 | 1.4538 |
| 7 | 125–125+ | 23–24 | 11.2 | 1.4526 |
| | | | 131.0 | |

Fractions 1 and 2 (sharp smelling, lacrymatory, colorless liquid) consisted mainly of 1,2-dichloroethylene carbonate. A pure refractionated sample formed a colorless liquid. This was dichloroethylene carbonate:

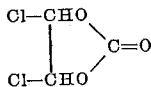

B.P.=78–79°/19–20 mm.; $n_D^{25}$=1.4605.

*Analysis.*—Found percent C=22.95; percent H=1.21; percent Cl=45.34. Theor. for $C_3H_2O_3Cl_2$ percent C=22.94; percent H=1.28; percent Cl=45.18.

Infrared analysis of the pure liquid shows its most prominent absorption at 5.40μ indicating the continued presence of a strained ring carbonyl function as is present in ethylene carbonate itself. In this paragraph and elsewhere herein, temperatures should be understood at ° C. even though not so specifically designated as centigrade.

Fractions 5, 6 and 7 were nearly pure monochloroethylene carbonate:

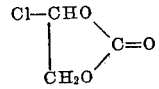

A pure refractionated sample formed a colorless liquid. B.P. 106–107°/10–11 mm.; $n_D^{25}$=1.4530.

*Analysis.*—Found percent C=29.58; percent H=2.54; percent Cl=29.15. Theor. for $C_3H_3O_3Cl$ percent C=29.41; percent H=2.47; percent Cl=28.95.

Infrared analysis showed sharp strained ring carbonyl absorption at 5.45μ.

Example II.—Chlorination of ethylene carbonate

A stream of chlorine was passed through 303 g. (3.44 moles) of freshly distilled ethylene carbonate at 63–70° in the presence of the ultraviolet light. After 24 hours the gain in weight was 119 g. (3.44 moles for monochloro substitution). Vacuum rectification yielded 28.0 g. (5.2%) of 1,2-dichloroethylene carbonate and 291 g. (69.0%) of monochloroethylene carbonate. Further rectification afforded pure 1,2-dichloroethylene carbonate (B.P. 78–79° at 19–20 mm.; 178° at 739 mm.; $n_D^{25}$ 1.4610; $d_4^{25}$ 1.5900; $MR_D$ calcd. (Eisenlohr) for $C_3H_2O_3Cl_2$: 26.9. Found: 27.2.

*Analysis.*—Calcd. for $C_3H_2O_3Cl_2$: C, 22.9; H, 1.3; Cl, 45.2. Found: C, 22.9; H, 1.2; Cl, 45.3. Strong strained ring carbonyl absorption at 5.40μ); pure monochloroethylene carbonate (B.P. 106–107° at 10–11 mm., 212° at 735 mm., $n_D^{25}$ 1.4530, $d_4^{25}$ 1.5082, $MR_D$ calculated for $C_3H_3O_3Cl$: 22.0. Found: 22.0.

*Analysis.*—Calcd. for $C_3H_3O_3Cl$: C, 29.4; H, 2.5; Cl, 29.0. Found: C, 29.6; H, 2.5; Cl, 29.2. Strong strained ring carbonyl absorption at 5.45μ).

Example III.—Preparation of vinylene carbonate from monochloro ethylene carbonate

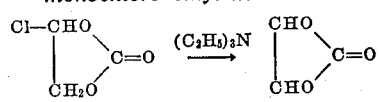

Monochloro ethylene carbonate (25.9 g.; 0.211 mole) was mixed with 150 ml. of dry ether in a 500 ml. three neck flask equipped with stirrer, condenser, and separatory funnel. Freshly fractionated triethylamine (22.4 g.; 5% excess) in 50 ml. of dry ether was added dropwise over a 10 hour period at room temperature. Stirring was continued overnight and for the following day. The amber colored liquid was decanted from the dark semicrystalline triethylamine hydrochloride which lined the flask and the ether was stripped off until a total of 50 ml. remained.

The flask was stoppered with a calcium chloride tube and set aside for one week. During that time a large amount of triethylamine hydrochloride mixed with some dark amorphous material precipitated out. After decantation, the remaining ether was removed under vacuum and the residue distilled to yield 10.3 g. (0.12 mole; 56.6%) of a colorless liquid, B.P. 74–77°/30–31 mm. which solidified when cooled by ice. A purer sample of vinylene carbonate was obtained by fractionation and had the following properties: B.P. 73–74°/31–32 mm.; M.P.=20–21°; $n_D^{25}$=1.4190.

Found: percent C=42.14; percent H=2.41. Theor. for $C_3H_2O_3$ percent C=41.87; percent H=2.33.

Infrared analysis showed distinctive carbon hydrogen absorption at 3.12μ and strained ring carbonyl absorption at 5.48μ as well as characteristic maxima at 7.40, 8.60, 9.45 and 11.15μ. The compound decolorized chlorine in chloroform readily. It decolorized neutral permanganate solution instantaneously as contrasted to the inertness of ethylene carbonate and slowness of reaction of monochloro ethylene carbonate with this reagent. A freshly distilled sample absorbed 95% of the theoretical quantity of hydrogen on catalytic hydrogenation over a platinum oxide catalyst to yield ethylene carbonate. The hydrogenation product was identified as ethylene carbonate by melting point, mixed melting point, and infrared analysis.

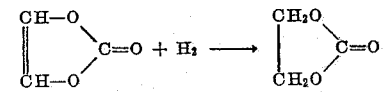

The infrared absorption maxima were identical at 5.52, 10.38, 12.98 and 14.02μ (in ether). The melting point data were:

Hydrogenation product [1] _____ M.P. 35.8–36.0°; 1°/min. (uncorr.)

Ethylene carbonate [1] _____ M.P. 36.0–36.2°; 1°/min. (uncorr.)

Mixed melt _____ M.P. 36.0–36.2°; 1°/min. (uncorr.)

[1] Recrystallized from ether at low temperature.

Example IV.—Synthesis of vinylene carbonate

I took 200 g. (1.63 moles) monochloroethylene carbonate (B.P. 121–122°/22–23 mm.), and 169 g. (2% excess) of triethylamine (Eastman-fractionated—B.P.=88.5–88.6° uncorrected)

The monochloroethylene carbonate was mixed with 250 ml. of dry ether in a one liter three-neck flask fitted with a condenser and Heishberg stirrer. A few tenths of a gram of crystalline triethylamine hydrochloride was added and the mixture heated to reflux. The amine, diluted with about one-third of its volume of ether, was added from a dropping funnel over about a 12 hour period and refluxing and stirring continued another 33 hours. The dark solids were filtered on a Buchner funnel and washed carefully three times with 75–100 ml. portions of ether. The air dried solids weighed 219 g. (theoretical amount of triethylamine hydrochloride is 224 g.). Most of the ether was removed from the filtrate through a packed column over a three-hour period, and a second batch of solid which weighed 7.0 g. after washing with ether was obtained.

The remaining ether was taken off under vacuum and the dark residue distilled from a 100 ml. Claisen flask.

|   | B.P., degrees | Pressure in mm. | Wt., g. | $n_D^{25}$ |
|---|---|---|---|---|
| 1 | 73–74 | 32–33 | 20.0 | 1.4195 |
| 2 | 74 | 32–33 | 38.7 | 1.4195 |
| 3 | 74–75 | 32–33 | 27.1 | 1.4205 |
| 4 | 75–85 | 32–33 | 7.8 | 1.4253 |
| 5 | 85+ | 32–33 | 2.9 | 1.4535 |

Cuts 1–4 solidified when cooled with ice. Redistillation of cut 4 gave 6.5 g. at 73–76°/33–34 mm.; $n_D^{25}=$ 1.4208. Total weight of cuts 1–3 and redistilled portion of cut 4=92.3 g. (65.8% of theoretical).

Cuts 1 and 2 became slightly orange on standing. Fractionation of the material and storage in the refrigerator are recommended.

*Example V.—Dechlorination of 1,2-dichloroethylene carbonate with zinc dust to prepare vinylene carbonate*

A mixture of 14.7 g. (.0936 mole) of 1,2-dichloroethylene carbonate, 20 g. (.31 mole) of zinc dust, and 50 ml. of ethylene glycol dimethyl ether was refluxed with stirring for 16 hours. The mixture was filtered, the solids washed with ether, and solvent removed through a packed column. Distillation from a small Claisen flask gave 1.76 g. (22%) of vinylene carbonate as a white solid in the iced receiver (B.P. 43–45°/8–9 mm.; $n_D^{25}=1.416$). The infrared curve was identical with that produced by a sample of vinylene carbonate as prepared in Examples III and IV from monochloroethylene carbonate.

POLYMERIZATION OF VINYLENE CARBONATE

On heating vinylene carbonate with small amounts of benzoyl peroxide, polymers were formed. The molecular weight of these polymers varied with the experimental conditions. The polymers have the repeating unit following:

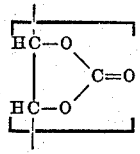

*Example VI.—Polymerization of vinylene carbonate*

About 0.5 g. of vinylene carbonate was sealed in a small Pyrex tube with a small granule of benzoyl peroxide and heated three hours at 100°. The product was a nearly colorless, tough, plastic material which soon became hard and brittle on exposure to air.

As will be disclosed in detail later the polymerization products are of two types, (1) viscous liquids and (2) clear solids. The liquids are less highly polymerized and the solids are relatively highly polymerized.

HYDROLYSIS

Shaking a few milligrams of the solid polymer with a milliliter of 10% sodium hydroxide brought about complete solution in 5 to 10 minutes.

On hydrolysis, water soluble polymers were obtained. These hydrolyzed polymers have the repeating unit:

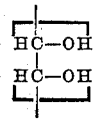

The hydrolyzed polymers of both the solid and liquid polymers are water soluble.

It will be noted as disclosed above that my chlorination process produces both dichloro ethylene carbonate and monochloro ethylene carbonate. Also, as shown above, I use either or both in preparing the vinylene carbonate but I prefer to prepare the vinylene carbonate from the mono compound.

REACTION PRODUCTS

The polymers of vinylene carbonate obtained as described in Examples V and VI are further reacted in various ways. For example, (1) The polymers before being hydrolyzed react with compounds of the formula $R_2NH$ or with compounds of the formula $RNH_2$, where in either case R=H, an alkyl group or an aryl group, if mixed at relatively low temperatures (e.g. room temperatures) to produce a polymerized compound having the following repeating units:

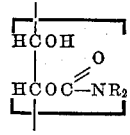

In the case of such reaction, depending on the proportions of the reactants and other conditions of the reaction some of the repeating units of the polymerized compounds may remain with the carbonate structure or all may be converted to the structure of the unit shown above. At least part of the units will be of the structure shown above.

(2) The polymers before hydrolyzation react with compounds of the formula ROH where R is an alkyl group, an aryl group or a substituted aryl group if the reaction is run at relatively high temperatures and in the presence of a basic catalyst, to produce a polymerized compound having the following repeating units:

In the case of such reaction, depending on the proportions of the reactants, and other conditions of the reaction some of the repeating units of the polymerized compounds may remain with the carbonate structure or all may be converted to the structure of the unit shown above. At least part of the units will be of the structure shown above.

(3) The polymers before being hydrolyzed react with compounds having the formula RSH where R is an alkyl group, an aryl group or a substituted aryl group if run at relatively high temperatures and in the presence of a basic catalyst, to produce a polymerized compound having the following repeating units:

In the case of such reaction also depending on the proportions of the reactants and other conditions of the reaction some of the repeating units may retain the carbonate structure or all may be converted to the structure shown above. At least part of the units will have the structure shown above.

(4) The polymers before being hydrolyzed react with compounds having the formula $R_2NH$ or with compounds having the formula $RNH_2$, where in either case R=H, an alkyl group, an aryl group or a substituted aryl group if run at relatively high temperatures and in the presence of a basic catalyst to produce a polymerized compound having the following repeating units:

In the case of such reaction, also depending on the proportions of the reactants and other conditions of the reaction some of the repeating units may retain the carbonate structure or all may be converted to the structure shown above. At least part of the units will have the structure shown above.

(5) The polymers before being hydrolyzed react with compounds having the formula RCOOH where R=H, an alkyl group, an aryl group, or a substituted aryl group, if run at relatively high temperatures and in the presence of a basic catalyst to produce a polymerized compound having the following repeating units:

In the case of such reaction also depending on the proportions of the reactants and other conditions of the reaction, some of the repeating units may retain the carbonate structure or all may be converted to the structure of the unit shown above. At least part of the units will be of the structure shown above.

On reaction with polybasic organic acids, the hydrolyzed polymers are crosslinked. The polymers are also crosslinked on reaction with polyaldehydes, such as glyoxal; with anhydrides of polybasic acids, such as phthalic anhydride, and maleic anhydride; with aldehydes such as formaldehyde, acetaldehyde, chloroacetaldehyde, and benzaldehyde; with polyisocyanates; and with polyisothiocyanates.

The hydrolyzed polymers also undergo reactions for nitration, acetylation, alkylation (etherification), carbalkoxylation(—$CH_2COOH$), acetyl formation and other such reactions.

The vinylene carbonate is useful in forming polymers, hydrolyzed polymers, copolymers, as a dienophile in the Diels Alder reaction, and derivatives of such polymers, hydrolyzed polymers, and copolymers. It is useful as a constituent of embalming fluids, and as a raw material for resins, fibers, insecticides, fungicides, and miticides. The polymers, hydrolyzed polymers, copolymers and derivatives of such polymers, hydrolyzed polymers and copolymers are also useful as blood plasma extenders, soil conditioning agents, alkyd resin intermediates and agents useful in improving the action of plant growth regulating chemicals. The hydrolysis products are also useful as water soluble adhesives, film formers, paints, etc.

CONDITIONS OF REACTIONS

CHLORINATION

The time required for chlorinating ethylene carbonate and the amount of chlorine required may be reduced substantially under the time used in Examples I and II. In the chlorination step, the reaction occurs slowly at room temperature or below but proceeds more rapidly with heat. Therefore a temperature of 30° C. or higher is desirable. The presence of ultraviolet light is necessary. It may be supplied by means other than the one herein described (such as, for example, bringing ultraviolet light in from outside of the reaction chamber in any way or by utilization of the sunlight in any way).

DEHYDROCHLORINATION

The amine used in the preparation of vinylene carbonate from monochloro ethylene carbonate is preferably triethylamine but may be any other tertiary amine-$R_3N$ of which the substituted groups are either aliphatic having from 2 to 4 carbon atoms (e.g. triethylamine, tributylamine, tripropylamine, triisopropylamine, diethyl isopropyl amine, etc.) or are alicyclic having not over 6 carbon atoms (such as, diethylcyclohexylamine). Trimethylamine is not satisfactory. I prefer to use ether as the solvent in this reaction although other solvents are usable.

Example VII.—Synthesis of vinylene carbonate

I mixed 40 g. of monochloroethylene carbonate (prepared as outlined in Example I) in 100 ml. of dry ether with constant stirring and heating. I added dropwise 35 g. of triethylamine with continued heating and stirring for about 3 days. I filtered and removed the ether from the filtrate. The residue was distilled and I obtained a yield of vinylene carbonate of about 60% of theoretical.

Example VIII

I followed the same procedure as in Example VII using proportionate molar quantities of diethylcyclohexylamine instead of triethylamine. I obtained a yield of vinylene carbonate of about 60% of theoretical.

Example IX

I followed the same procedure as in Example VII using tri-n-butylamine instead of triethylamine. I obtained a yield of vinylene carbonate of about 10% of theoretical.

Example X

I followed the same procedure as in Example VII using acetonitrile instead of ether. I obtained a yield of vinylene carbonate of about 51% of theoretical.

Example XI

I followed the same procedure as in Example VIII using acetonitrile instead of ether. I obtained a yield of vinylene carbonate of about 33% of theoretical.

DECHLORINATION

Other methods of dechlorination can be utilized to convert the dichloroethylene carbonate to vinylene carbonate instead of the method of dechlorination by the use of zinc dust as described in Example V.

POLYMERIZATION

Any other customary polymerizing catalyst may be used instead of benzoyl peroxide (e.g. di-t-butyl peroxide, dimethyl azobisisobutyronitrile, acetyl peroxide, propronyl peroxide). Hydroperoxides such as paramenthane hydroperoxide and cumene hydroperoxide may be used. The polymerization is, as stated above, also induced by acid catalysts (e.g. protonic acid such as perchloric acid, sulfuric acid, hydrogen fluoride, hydrochloric acid), and by non-protonic acids, i.e. acids in the Lewis sense (such as boron fluoride, aluminum chloride, zinc chloride, etc.). Combinations of protonic acids with Lewis acids (such as hydrogen chloride-aluminum chloride, hydrogen fluoride-boron fluoride, etc.) are also used.

Example XII

About 0.5 g. of vinylene carbonate was sealed in a small Pyrex tube with a small granule of benzoyl peroxide and heated for an hour at 100° C. The product was a nearly colorless plastic liquid.

Example XIII

About 0.5 g. of vinylene carbonate was sealed in a small Pyrex tube with a small granule of benzoyl peroxide and heated for two hours. The product was a nearly colorless viscous liquid something like the liquid produced in Example XII but of considerably higher viscosity.

Example XIV

A gram of vinylene carbonate was sealed in a Pyrex tube with a small amount of sulfuric acid and heated for three hours at 100° C. The product was a nearly colorless tough plastic material.

REACTION OF POLYMERS

The polymers produced in Example XII, XIII and XIV react in the same way to form various reaction products as do the polymers of Example V as described under "Reaction Products" (columns 6 and 7 hereof).

It is to be understood that the above described embodiments of my invention are for the purpose of illustration only and various changes may be made within the limitations of the following claims without departing from the scope of my invention.

I claim:

1. A composition of matter consisting of

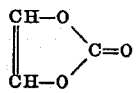

2. A process of forming vinylene carbonate consisting of the steps of chlorinating ethylene carbonate in the presence of ultraviolet light to form monochloro ethylene carbonate and then contacting the monochloro ethylene carbonate with triethylamine.

3. A process of forming vinylene carbonate consisting of contacting monochloro ethylene carbonate with triethylamine.

4. A process of forming vinylene carbonate consisting of treating monochloro ethylene carbonate with a tertiary amine of which each of the substituents is selected from the class consisting of lower alkyl groups having from two to four carbon atoms.

5. A process of forming vinylene carbonate consisting of the steps of chlorinating ethylene carbonate in the presence of ultraviolet light to form mono chloro ethylene carbonate and then mixing and heating the chloro ethylene carbonate with triethylamine.

6. A process of forming vinylene carbonate consisting of mixing monochloro ethylene carbonate with triethylamine and heating the mixture.

No references cited.

UNITED STATES PATENT OFFICE
CERTIFICATE OF CORRECTION

Patent No. 2,918,478                           December 22, 1959

Melvin S. Newman

It is hereby certified that error appears in the printed specification of the above numbered patent requiring correction and that the said Letters Patent should read as corrected below.

Column 2, lines 61 to 64, the formula should appear as shown below instead of as in the patent:

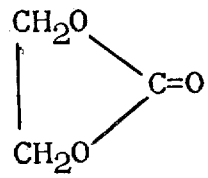

column 4, lines 3 to 6, the right-hand portion of the formula should appear as shown below instead of as in the patent:

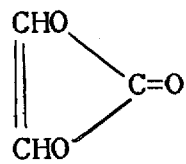

Signed and sealed this 6th day of September 1960

(SEAL)
Attest:
ERNEST W. SWIDER                          ROBERT C. WATSON
Attesting Officer                         Commissioner of Patents